Jan. 31, 1933. W. G. RUECKART ET AL 1,895,822
CLUTCH
Filed Sept. 22, 1930 2 Sheets-Sheet 1
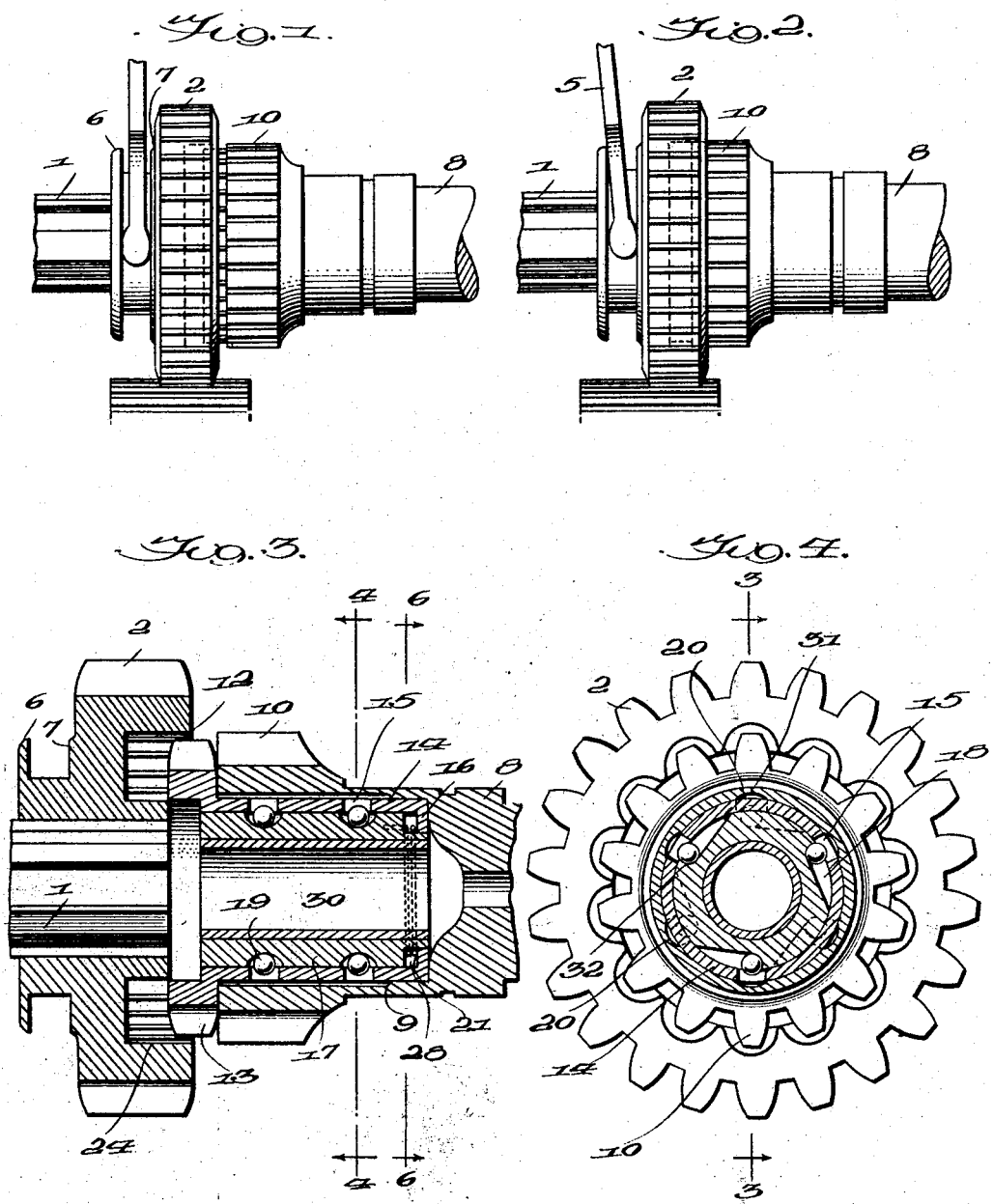

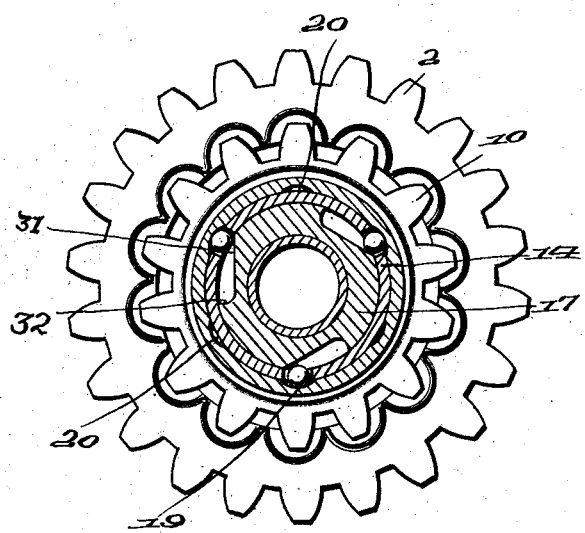
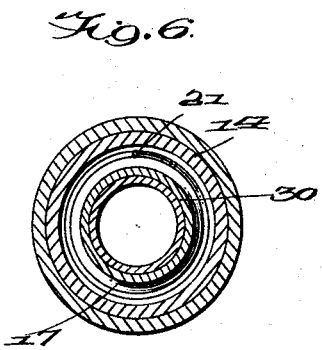
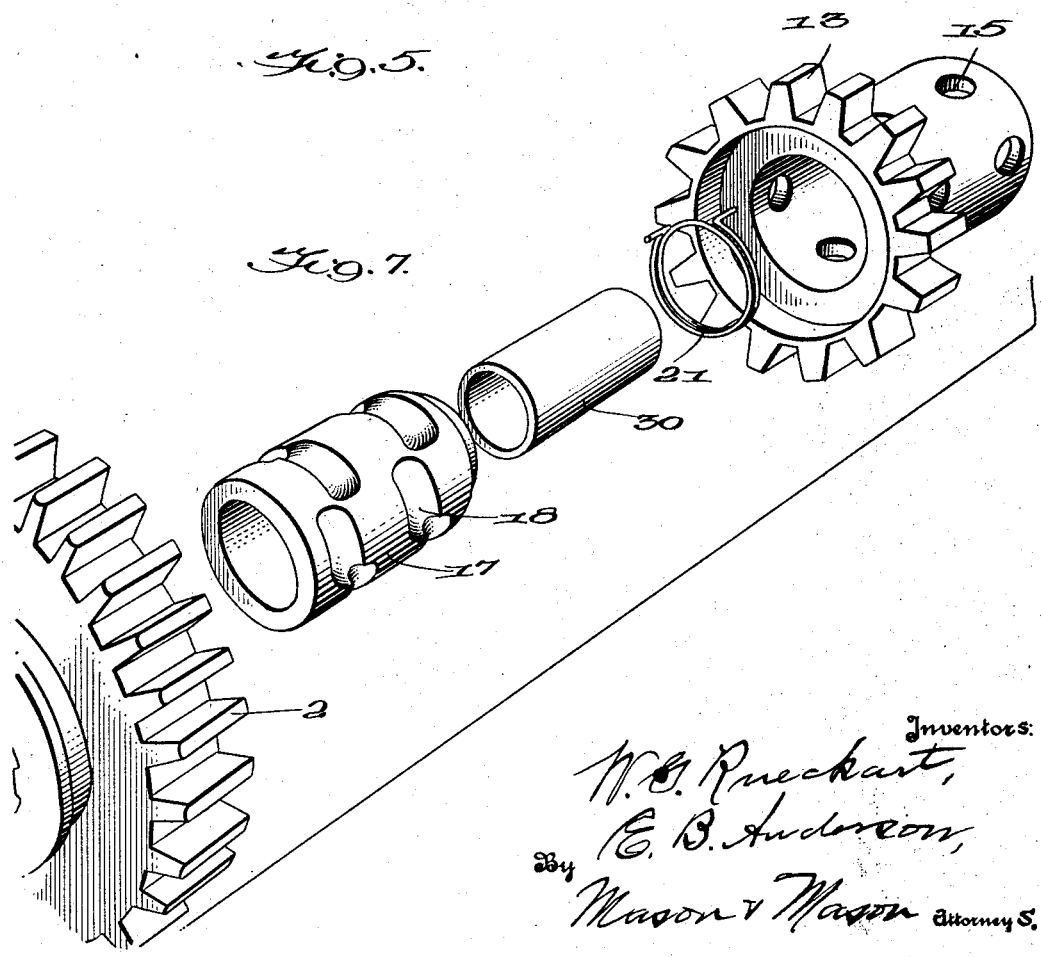

Patented Jan. 31, 1933

1,895,822

UNITED STATES PATENT OFFICE

WALTER G. RUECKART AND ELMER B. ANDERSON, OF BIG SPRING, TEXAS

CLUTCH

Application filed September 22, 1930. Serial No. 483,655.

This invention relates to clutches, of the one-way or ratchet type.

The invention has particular application to clutches of the type employing a plurality of balls which are caused to automatically establish connection between two parts rotating at different speeds, and is herein shown as employed in a sliding gear transmission for motor vehicles. In the particular application of the clutch herein illustrated, the elements thereof are utilized to permit the automatic overrunning of a driven part relatively to a driving part in a sliding gear transmission to permit what is known as "free wheeling", or coasting without release of the usually manually operated clutch. A form of transmission of the type referred to is illustrated herein in connection with the automatic one-way clutch which forms the subject of the present invention.

The arrangement of clutching devices for effecting selective free wheeling disclosed herein, forms no part of the present invention, the same being shown, described and claimed in my co-pending application, Serial No. 483,654, filed of even date herewith.

An important feature of the invention as herein claimed is found in an automatic clutch of the type referred to which embodies a tubular member provided exteriorly with a plurality of grooves extending circumferentially of the member and increasing in depth from one end to the other thereof, in connection with a plurality of balls movable in said grooves, a surrounding ball cage in the form of a sleeved extension from a clutch element, and a concentric surrounding portion of the driven shaft or member which is provided upon its interior surface with a plurality of longitudinal grooves or depressions. A spiral spring or its equivalent forms a connection between the ball cage and tubular clutch member. Upon rotation of the ball cage the balls will move outwardly by centrifugal force and, through the inertia of the parts, the balls and cage will move relatively to the grooved clutch member, thereby effecting a positive locking engagement between the driving and driven members of the clutch and transmission assembly. The spiral spring having been placed under tension, as soon as the conditions of relative speed of rotation have been been changed so that the driven member will outrun the driving member, the relatively movable parts of the clutch will reverse in their movements and permit the balls to move into position for unclutching the parts, thus permitting free wheeling or coasting of the motor vehicle without release of the ordinary pedal controlled clutch.

Other features of the invention than those herein specifically referred to, such as novel combinations of parts and details of construction, will be best understood from the following description when considered in connection with the accompanying drawings, in which:

Fig. 1 shows in side elevation certain parts of a sliding gear transmission in connection with which the present invention is used;

Fig. 2 is a similar view, showing the parts in a different position;

Fig. 3 is a sectional view on the line 3—3 of Fig. 4;

Fig. 4 is a sectional view on the line 4—4 of Fig. 3;

Fig. 5 is a sectional view similar to Fig. 4, but showing the parts in different positions;

Fig. 6 is a transverse sectional view on the line 6—6, Fig. 3, and

Fig. 7 is a view showing, in perspective, the several parts of the clutch and related transmission elements disassembled.

As shown and described in our co-pending application hereinbefore referred to, the parts of the gear transmission as illustrated herein comprise, in connection with a drive shaft 1 and a driven shaft 8, a toothed gear 2 which is splined on the shaft 1, for sliding movement thereon by a fork 5 engaging a groove between two collars 6 and 7 on the gear 2. The shaft 8 may be connected to the wheels of the motor vehicle in any preferred or usual manner, as through the differential. Said shaft 8 is provided with a recess 9 and an externally toothed clutch member 10, and as herein shown the recess 9 is provided with a plurality of longitudinally extending, spaced shallow grooves or depressions 20. The structure herein described, namely, the shaft 8 having recess 9 provided with the grooves 20, constitutes the driven member of the transmission to which a driving element for applying power from the motor is adapted to be clutched or unclutched, in accordance with varying conditions of speed ratio between said parts, as will be hereinafter more fully described.

The gear 2 is provided in its rear face with a circumferential recess 24 surrounded by a plurality of teeth 12. The recess containing the teeth 12 is of sufficient size to slide over and effect meshing engagement between the teeth 12 and the teeth of a clutch member 13. The member 13 is herein shown as formed as part of a sleeve 14 which is provided with a plurality of holes 15 and forms the ball cage. The inner end of the sleeve 14 has an inturned annular flange 16. Enclosed within and snugly fitting the bore of the sleeve 14 is a cylindrical ball-carrying clutch member 17 provided with a plurality of inclined grooves 18, which increase in depth from their end portions 31, to their opposite ends 32. Seated within these grooves 18 are the clutch balls 19 which latter, in the position of parts shown in Fig. 4, are located in the deepest portions of the grooves 18 and in line with the holes 15 in the sleeve 14 and the depressions 20 in the inner face of recess 9. In this position of the parts the sleeve 14 is unclutched from the shaft 8.

When the driving element 13 with its sleeve 14 is rotated through application of power from the motor through gear 2 the sleeve 14, due to the inertia of the parts, is caused to travel a short distance relatively to the clutch member 17, thereby bringing the shallow portions of the grooves 18 apposite the holes 15 and holding the balls in clutching engagement with the parts 8, 14, and 17, as shown in Fig. 5. The inner end of the clutch member 17 is provided with an annular recess 28 to receive a spiral spring 21, whose two ends are respectively anchored to the flange 16 and the opposite end face portion of the clutch member 17. This spring is put under a slight tension when the clutch parts move from the position shown in Fig. 4, to that shown in Fig. 5 which represents the positive or driving position of the clutch. When the driven member of the clutch is increased in speed beyond that of the driving member, the shaft 8 will overrun the sleeve 14 thereby permitting the member 17 and clutch balls to fall back into the position shown in Fig. 4, permitting free movement of the driven shaft independently of the clutch driving member 13 and its sleeve 14. Such position of the parts is that which they originally occupied, as illustrated in Fig. 4.

The clutch member 17 is herein shown as being lined with a brass bushing 30.

It will be observed that the clutch parts when in driving position, are locked in such manner that power is transmitted positively from the power shaft 1, through the toothed members 12 and 13 and clutch parts 14, 15, 19 and 20 to the shaft 8, and when moving into such position the sleeve 14 will rotate relatively to member 17 against the tension of spring 21 to lock the parts in the position shown in Fig. 5, the relative movement between 14 and 17 being permitted by the inertia of the parts, and the fact that the clutch member 17 is so fitted to the sleeve as to permit easy rotative movement of the member 17. It will also be seen that when the driven element 8 increases its speed beyond that of the driving element 14, the clutch members will reverse their relative positions from that shown in Fig. 5, back to the position shown in Fig. 4, thus permitting overrunning of the clutch-driven member 8, the reaction of spring 21 assisting in the restoration of the parts to the latter position.

The teeth 10 may be engaged by the teeth 12 of the sliding gear through continued movement to the right of the latter, when it is desired to omit the clutch connection between the driving and driven parts of the transmission, but this feature forms no part of the present invention, being claimed in our co-pending application above referred to.

Changes may be made in the details of construction or relative arrangement of the parts as shown without departing from the scope of the invention, provided such variations are within the contemplation of the following claims.

What we claim is:—

1. In a clutch, the combination of a driving member having an apertured sleeve, a clutch member enclosed within said sleeve and provided with a plurality of grooves of progressively increasing depth, a clutch member surrounding said sleeve and provided with a plurality of longitudinal depressions, and clutch ball elements arranged in said grooves and movable into and out of said depressions.

2. In a clutch, the combination of an annular clutch member provided with a plurality of circumferential grooves of gradually increasing depth, a sleeve concentrically surrounding said member and having apertures arranged to register with said grooves and movable relatively to said member, resilient means connecting said clutch member and sleeve, an annular clutch member enclosing said parts and provided with a plurality of longitudinal depressions, and a plurality of balls in said grooves arranged to be moved outwardly and to be locked in said depressions upon relative movement of said sleeve and clutch member.

3. In a clutch, the combination with an annular clutch member provided with a plurality of circumferentially extending grooves increasing in depth from end to end, a sleeve surrounding said member and provided with a plurality of apertures arranged to register with said grooves, a surrounding clutch member provided with a plurality of depressions in its inner surface to register with said apertures and grooves, and means whereby upon rotation of said sleeve the same is caused to rotate relatively to said clutch member to cause said balls to move for effecting interlocking engagement between said sleeve and surrounding clutch member.

4. In a clutch, the combination with an annular clutch member provided with a plurality of circumferentially extending grooves increasing in depth from end to end, of a sleeve surrounding said member and having a plurality of apertures registering with said grooves, clutch balls in said grooves, a spring yieldingly connecting said clutch member and sleeve, and an outer annular clutch member surrounding said parts and provided with depressions in its inner surface to receive said balls when said parts are in clutching engagement.

5. In a clutch, the combination with a driving member having a ball cage thereon provided with apertures through its cylindrical side and having an inturned flange at one end, an annular clutch member enclosed within said ball cage and provided with grooves registering with said apertures, a spring connecting said flange and member, and a driven clutch member constructed to enclose said parts and having a plurality of longitudinally extending depressions upon its inner surface to be engaged by said clutch balls when the clutch is so actuated as to effect locking engagement between the driving and driven elements thereof.

In testimony whereof we have hereunto set our hands this 17th day of September A. D. 1930.

WALTER G. RUECKART.
ELMER B. ANDERSON.